UNITED STATES PATENT OFFICE.

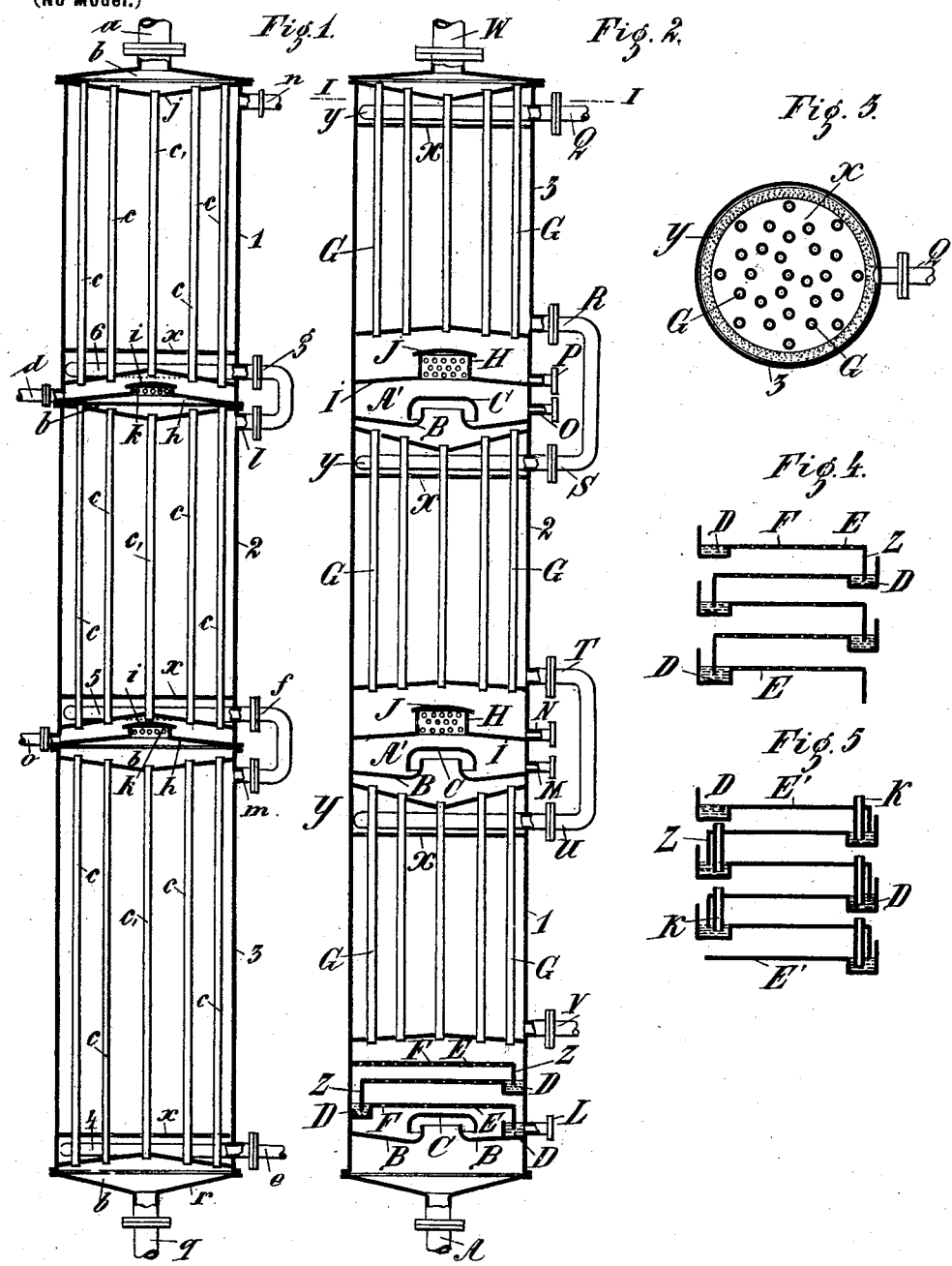

VICTOR SLAVIČEK, OF VIENNA, AUSTRIA-HUNGARY.

FRACTIONAL CONDENSER.

SPECIFICATION forming part of Letters Patent No. 696,206, dated March 25, 1902.

Application filed September 1, 1900. Serial No. 28,841. (No model.)

*To all whom it may concern:*

Be it known that I, VICTOR SLAVIČEK, a subject of the Emperor of Austria-Hungary, residing at Vienna, in the Empire of Austria-Hungary, have invented new and useful Improvements in Apparatus for Fractional Condensation of the Constituents of a Vapor Mixture, of which the following is a specification.

The subject of the present invention is an apparatus for the fractional condensation of the constituents of a vapor mixture, more particularly of alcoholic vapor, for the purpose of obtaining a pure distillate without any expensive rectification being required.

In my new apparatus a number of condensers are employed for the purpose of separating the distillates. The vapors pass from one condenser to the other in order, as many condensers being used as may appear desirable, whereby the various portions of the vapors are condensed and separated one after the other, according to the temperatures of condensation of the various volatile substances. The vapors are condensed or cooled down by the cooling liquid—e. g., water—flowing regularly through all the condensers from below upward, or, vice versa, in a contrary direction to the vapors, the amount depending upon the quantity and temperature of the vapors. As the vapors of the different substances successively condense they are severally received by conducting-bottoms and led off to separate receptacles. Of course the vapor condensing at the lowest degree of heat will be deposited first and the others in regular order, according to the amount of heat which must be abstracted for their condensation.

The details of the construction of the apparatus depend upon whether the constituents of the vapor mixture are such as can be separated readily or only with difficulty.

The invention is illustrated by the annexed drawings.

Figure 1 is a vertical section of a simple apparatus in which the vapors flow from above downward, the cooling liquid rising from below upward. Fig. 2 is a vertical section of an apparatus in which the vapors flow from below upward and the cooling liquid from above downward, the construction being somewhat modified. Fig. 3 is a cross-section taken on the line I I of Fig. 2. Figs. 4 and 5 are detail views to be hereinafter referred to.

The apparatus shown in Fig. 1 illustrates the type of the invention and serves for the fractional condensation of the constituents of a vapor mixture which are readily separable. The apparatus consists of the condensers 1 2 3, provided with inlet $a$ and outlet $q$. The vapor composed of various different constituents enters the apparatus through the pipe $a$, passing first into the space $b$ and then through the pipes $c$ downward. By reason of the decrease in temperature on the passage downward the most readily condensable vapors will be so far cooled that they will be condensed above, the products running from the upper bottom $j$ of the condenser through the central pipe $c'$ to the cover $i$, which prevents mixing of the products of condensation, and thence onto the buckled or arched collecting-bottom $h$. Those vapors which only condense with difficulty naturally are not thus condensed above. The products of condensation separated in the pipes $c$ drop onto the collecting-bottom $h$ and are led off through the pipe $d$. The cooling liquid (e. g., water) entering through the lowermost inlet $e$ flows along the bent pipe 4, arranged to suit the wall of the condenser 3 and perforated below and laterally in order to maintain uniform temperature. Above the water-inlet pipes 4 5 6 water-distributing bottoms $x$, Fig. 3, are provided. These bottoms are furnished with apertures, through which the pipes $c$ are conducted, enough space, however, being left (as the drawing shows) for the cooling liquid to pass through. The latter gradually rises in temperature to the boiling-point of that constituent of the vapor which is most difficult to condense and then ascends at $m$, leaving the condenser 3 and entering the condenser 2 through the bend $f$ and pipe 5. Here it becomes heated to boiling-point of the constituents of the vapor which condense with moderate difficulty. It then rises at $l$, leaving the condenser 2 and entering condenser 1 through bend $g$ and pipe 6, and thereupon condenses those vapors which can be the most readily condensed. Finally it flows off at $n$ as boiling water. The vapor mixture thus purified of the condensed vapors flows through the sieve $k$, between cover $i$ and collecting-bottom $h$, through the central aperture of the chamber $b$ into the pipe $c$ of the condenser 2. Here the same process is repeated, with the difference that here only those vapors are condensed which can be condensed moderately easily, the temperature of the water rising at $m$ through $f$ being unable to condense those vapors which can only be condensed with much difficulty. The product of condensation flows off at $o$. The like process is again repeated in condenser 3, where complete condensation and cooling of the most difficultly condensable vapors take place, the product collecting in the chamber $b$ on the bottom $r$ and flowing off through outlet $q$. The products from $d$ and $o$ are cooled down to the necessary temperature in auxiliary coolers.

The apparatus shown in Fig. 2 is constructed according to the same principles, but differs somewhat in details. This apparatus is especially intended for the condensation of a vapor mixture of constituents which are extremely difficult to separate—*e. g.*, alcoholic vapors. The casing is provided near its lower end with a series of perforated horizontal partitions or bottoms E, Figs. 2 and 4, each of which has on one side a downward flange or tip $z$, dipping into a liquid-receiving trough or groove D of the next lower one of said partitions or bottoms. Below these is arranged a partition or bottom B, having the last of the troughs or grooves D and also a central opening with raised neck, above which is arranged a cap C, supported thereon, leaving side openings for the ascent of vapor. These parts B, C, and E are fixed in said casing in any ordinary and convenient way. Above each set of cooling-pipes G is another bottom or partition B and cap C, corresponding in construction and use to those already described, (indicated by the same letters.) The vapors enter at A and strike against bottom B, heating it, and then passing between bottom B and cap C, through the products of condensation there collected strongly mixed with second runnings. They then heat from below the lowest perforated bottom E, through the perforation F of which and the products of condensation above they must pass. The vapors then rise through the holes F of the next bottom E, there losing much of the second runnings, reaching the condenser 1, through the cooling-pipes G of which they ascend, and are freed of the second runnings. Hereupon the vapors ascend between the second bottom B and cap C, where the last traces of the second runnings are removed, pass through the sieve H, between the collecting-bottom I and cover J, and ascend through the pipes G of the condenser 2, whereby the alcoholic vapors are condensed. They then enter between the third bottom B and cap C, on which bottom the alcoholic products of condensation collect which are to be obtained before complete cooling of the vapors strongly mixed with first runnings, ascend through sieve H, between the collecting-bottom I and the cover J, and are condensed in the pipes G of the condenser 3 as alcohol strongly mixed with first runnings.

Naturally the form and member of the cap-bottoms, as also of the flat bottoms E, may be any suitable. The flat bottoms E, as Fig. 4 shows, are constructed with a gutter and bent-over edge $z$, which dips into the liquid collecting in the gutter D below. The bottoms may be perforated, as shown in Fig. 2, or may be provided with overflow-pipes (see Fig. 5) when ordinary sieve-bottoms are employed. The distillates are drawn off in the reverse direction, but in the same order, commencing from below, as in the apparatus shown in Fig. 1—that is to say, at L are drawn off the products of the second runnings, which can still be distilled, at M the crude alcohol, at N the fine spirit, at O the alcohol mixed with first runnings to a slight extent, and at P that mixed to a larger extent with such runnings. The cooling liquid runs at Q through the bent pipe W on to the water-distributing bottom $x$, then by reason of its specific gravity downward, thus enabling a uniform temperature to be maintained in C. It then runs through R, S, and Y on to the second distributing-bottom $x$. From B it falls by reason of its specific gravity, maintaining through the distribution the temperature of the boiling-point of aldehyde. It now runs through T and U on to $x$, sinking uniformly and maintaining the same temperature of the boiling-point of alcohol, finally flowing out at V. The remaining parts of the apparatus are the same as those shown in Fig. 1. One or more condensers may be used, according to the nature of the vapors. The height of such condensers, however, must be suited to the various degrees of heat of the cooling liquid and the necessary boiling-points of the vapors to be condensed, and the vapors must be cooled down as may be required according to the conditions of the case.

What I claim is—

1. An apparatus for fractional condensation of the constituents of a vapor mixture, consisting of communicating condensers comprising end chambers, a vapor-inlet at one end of the apparatus, a cooling-liquid inlet at the opposite end, sets of vapor-conduit pipes passing through each condenser, pipes for conducting the cooling liquid from one condenser to the other, perforated bottoms or partitions E for receiving the liquid entering from said pipes, an outlet for said cooling liquid, chambers between each two consecutive condensers formed by concave and convex walls, parts having perforated sides located on the upper walls, and outlets for conducting the products of condensation from said upper walls, all substantially as described.

2. An apparatus for fractional condensation of the constituents of a vapor mixture, consisting of communicating condensers comprising end chambers, a vapor-inlet at the bottom of the apparatus, a cooling-liquid inlet at the top, flat bottoms E having passages through them, located near the bottom of the lowermost condenser sets of vapor-conduit pipes passing through each condenser, pipes for conducting the cooling liquid from one condenser to the other, perforated bottoms or partitions E for receiving the liquid entering from said pipes, an outlet for said cooling liquid, chambers between each two consecutive condensers formed by concave and convex walls and intermediate plates having a central, capped aperture, conduits from said plates, parts having perforated sides located at the center of said upper walls and outlets for conducting the products of condensation from said upper walls, all substantially as described.

In witness whereof I have hereunto set my hand in presence of two witnesses.

VICTOR SLAVICEK.

Witnesses:
HANS SANNENHEIM,
ALVESTO S. HOGUE.